United States Patent [19]
Tarloff

[11] Patent Number: 4,806,008
[45] Date of Patent: Feb. 21, 1989

[54] IDENTIFIABLE EYEGLASSES

[76] Inventor: Frank Tarloff, 9596 Shirley La., Beverly Hills, Calif. 90210

[21] Appl. No.: 50,326

[22] Filed: May 18, 1987

[51] Int. Cl.[4] .................. G02C 11/02; G02C 5/14
[52] U.S. Cl. .................................. 351/51; 351/111; 351/52
[58] Field of Search ................... 351/51, 52, 111

[56] References Cited
U.S. PATENT DOCUMENTS 2,842,028  7/1958  Belgand .......................... 351/52

FOREIGN PATENT DOCUMENTS 1207368  12/1958  France ............................ 351/51

Primary Examiner—Rodney B. Bovernick
Attorney, Agent, or Firm—Samson B. Leavitt; Michael A. Leavitt

[57] ABSTRACT

An eyeglass temple bar having an oblong shaped recess in its inner side and retained in said recess an identification strip of flexible sheet material and preferably a removable window strip of transparent flexible sheet material covering said identification strip, and eyeglasses comprising one or two such temple bars.

14 Claims, 1 Drawing Sheet

IDENTIFIABLE EYEGLASSES

This invention relates generally to eyeglasses, and especially to identification means for a pair of eyeglasses comprising temple bars.

Thousands of eyeglasses are lost every year especially when left in public places such as trains, theatres, bars, taxis, restaurants, etc. For the most part, these glasses are never recovered because the loser doesn't remember where they were left and the finder has no way of knowing to whom they belong. Additionally, even should the owner recall or know where the glasses were left, it's often impossible to identify his glasses from among the many the restaurant or other public place has accumulated.

Eyeglasses could be provided with obvious means of identification of the wearer, such as a strip of pressure-sensitive adhesive-backed tape adhered to the temple bar or the temple bar could be directly stamped or embossed with the required information. In the first alternative, apart from esthetics, the exposed tape could be readily damaged, fall off, or be accidentally scraped off. In the second alternative, should the wearer have a change of address or phone number, a new temple bar would have to be fabricated and fitted at significant cost.

A primary object of the present invention is to provide identification means for a pair of eyeglasses which will not be subject to the above disadvantages.

Another object of this invention is to provide such identification means which permit and facilitate expeditious and inexpensive modification of the identifying indicia.

A further object of the invention is to provide identification means for a pair of eyeglasses that is simple and easy to use, and/or economical to manufacture.

Other objects and advantages of the invention will appear as the description proceeds.

The attainment of one or more of the above objects is made possible by my invention which includes the provision of an eyeglass temple bar comprising means at the front end for attachment to the lens support member of an eyeglass frame and an ear supported portion at the back end, an oblong shaped recess in the inner side of the portion between said ends and retained within said recess and identification strip of flexible sheet material carrying identifying indicia on its inwardly facing surface.

According to further aspects of my invention:

the opposite horizontal or, preferably, vertical sides of said recess may be undercut so that the bottom of the recess is, respectively, wider or longer than the opening of the recess and the said identification strip corresponds roughly or substantially in dimensions to said bottom, i.e. said strip is also wider or longer than the recess opening and is thus retained in, and without flexing cannot fall out of, the recess;

preferably, a removable window strip of transparent flexible sheet material of roughly the same dimensions as the identification strip covers and protects the latter strip, with preferably the opposite horizontal edges or ends, more preferably the opposite vertical edges or ends, of the window strip being outwardly sloped or provided with outwardly stepped flanges to enable the surface of the window strip to be approximately or substantially flush with the inner surface of the temple bar, i.e. slightly above, but more preferably at or slightly below, the level of the temple bar inner surface;

preferably one of the above-mentioned opposite ends of the window strip is provided with removal means such as a hole, groove, dimple or protruberance (ridge or dimple) to enable the strip to be more easily flexed and removed from the recess;

the identification strip may be relatively permanently or more preferably removably adherent to the bottom of the recess;

the above-described temple bar of my invention may constitute one or both of the eyeglass temple bars.

The temple bar and eyeglasses of my invention possess several important novel and unobvious features and advantages. Since the identification strip is in a recess, with its indicia-bearing surface preferably not or never significantly (e.g. no more than about 1/16 or 1/32 of an inch) above, and preferably at or below, the level of the inner surface of the temple bar, it is less visually obtrusive and is protected from accidentical or inadvertent removal, obfuscation, obliteration, scraping or other damage, as would more readily occur if an identification strip were simple adhered to the unmodified inner surface of the temple bar. When the wearer moves to another address or it is desired to change the identification for any for any other reason, the identification strip can be quickly and without significant cost removed and replaced or, if the strip adheres to and cannot easily be removed from the bottom of the recess, a new identification strip can be adhered over the old one. The identification strip should be adherent, preferably removably as with pressure sensitive adhesive or the like, to the bottom of the recess when either of the pair of opposite sides of the recess are not undercut, the preferred means for retaining the identification strip in the recess. The preferred flexible transparent window strip provides a further degree of the protection referred to above, its surface being as indicated above with respect to the identification strip, preferably not significantly above, and preferably at or below, the level of the inner surface of the temple bar.

After the initial modification of the molding equipment, no addtional costs are involved in molding the recess-containing temple bars of this invention using the usual plastics, thermoplastic or thermosetting, transparent, preferably translucent, more preferably sufficiently non-transparent to prevent the identification strip from being visually apparent through the outer surface of the temple bar. Since the main part of the eyeglasses involved in this invention is the described recessed temple bar, the manufacturer can make and offer the optometrist or optician, who can make the same offer to purchaser (wearer), temple bars with and without the above-described identifying features with any pair of eyeglasses. Similarly, currently used eyeglasses can be "modernized" at reduced cost by simply having the temple bars replaced with the temple bars of this invention.

The instant temple bars are typically relatively rigid strip or spatula-shaped pieces, generally of plastic material, about 1/16 to ¼, usually about ⅛, of an inch thick, about ¼ to ⅝, usually about ⅜, of an inch wide (i.e. high) but generally tapering in width from front to rear, and about 4 to 8, usually about 5.5 to about 6.5, inches long. The front end of the temple bar carries means, preferably a hinge bracket, pin or sleeve, for preferably swinging, foldable attachment to the lens support member of the eyeglass frame, and about 1 to 3 inches of the rear or back end is curved downward as an ear supported portion. The portion between said ends, and more particularly, the portion between the front end and the curved ear supported portion is relatively straight, usually about 3 to about 5 inches long, the described oblong shaped recess in the inner side of which is generally about 1 to about 2.5 inches long. The length, width and depth dimensions of the recess should preferably be only sufficient to permit insertion therein of a legible readable identification strip carrying sufficient identifying indicia such as name, address, phone number, post office box, or the like or any combination thereof on one temple bar or divided between two temple bars of the invention. Such minimal dimensions are preferred to avoid undue weakening of the temple bar, but in general, the width (height) and depth of the recess may range from about 10% to about 90%, preferably about 20% to about 80%, more preferably about 30% to about 60%, of respectively the width and thickness of the temple bar.

It will be understood that the term "oblong-shaped" as applied to the recess is intended to cover any configuration of greater length (from front to rear) than width (height), including dumbbell, hour glass, trapezoidal, eliptical and preferably rectangular configurations and variations thereof. It will also be understood that directional and positional terms referred to herein and in the appended claims such as inner, inward, outer, outward, front, back, rear, upper, lower, right, left, vertical, horizontal, height, and the like have reference to the normal position of eyeglasses and temple bars on the face and head of an upright human body.

The identification strip shape and dimensions should preferably conform to the shape and dimensions of the recess, especially the bottom of the recess, and may be made of paper, thin cardboard, business card or plastic material and the identifying inidicia thereon may be written, typed, stamped, printed, stencilled, embossed or any other means of transmitting intelligence. Relatively higher rip-resistant material such as plastic would be preferable when the identification strip is made adherent to the bottom of the recess to permit its removal without ripping or tearing.

Preferred means of attainment of one or more of the above objects are explained and illustrated in the following description and accompanying drawing in which similar reference characters identify similar elements in the several Figures.

Figure 1:
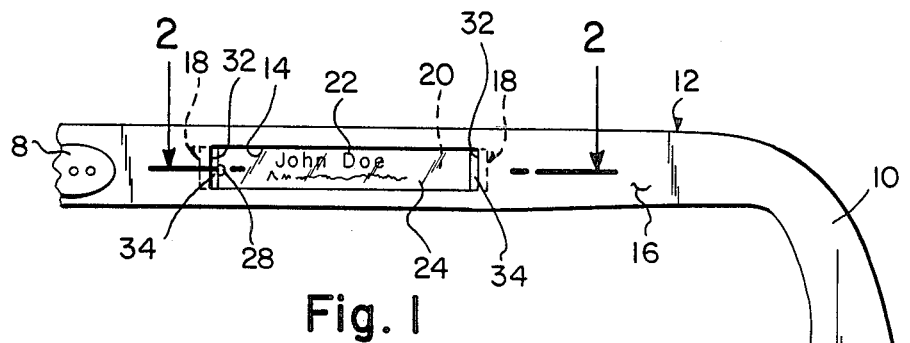
FIG. 1 is an outward elevational view of the inner surface of a right side temple bar illustrative of this invention.

As shown in FIG. 1, attachment hinge bracket 8 is carried on the front end, and covered ear supported portion 10 is the back or rear end of plastic temple bar 12. Oblong recess or slot 14 is in the inner side or surface 16, and the front and rear vertical ends or sides 18 of the recess are undercut so that the bottom of the recess is longer than its opening thereby serving to retain therein identification paper strip 20 of roughly the same width (or height) and (very slightly shorter) length as the said bottom. The identification strip 20 carries on its inner or inwardly facing surface identifying indicia 22.

Figure 2:
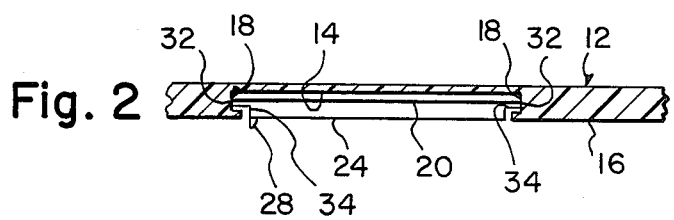
FIG. 2 is a downward cross-sectional view taken along arrow line 2—2 of FIG. 1.
Figure 3:
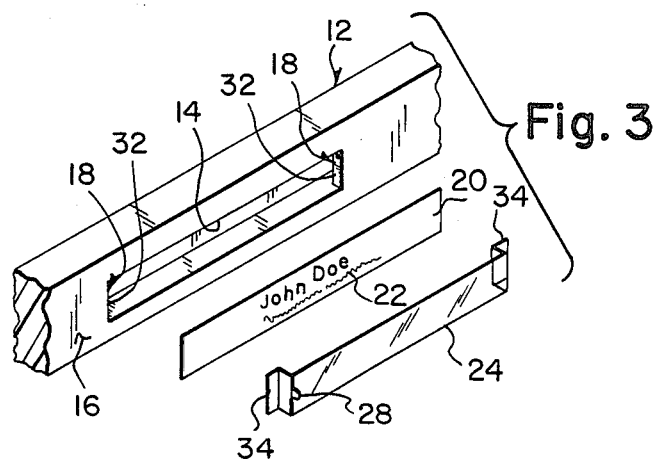
FIG. 3 is an exploded perspective view of elements shown in FIGS. 1 and 2.

Protective removable window strip 24 of transparent flexible plastic covers and is of roughly the same length and width dimensions as the identification strip 20. The window strip 24 carries at one end removal means in the form of pimple 28 (FIGS. 1, 2 and 3), or a hole or aperture 30 (FIG. 4) permitting application of force towards the other end, such as by finger nail, pin or other tool, to flex the window strip 24 for its removal from recess 14. As shown in FIGS. 1, 2 and 3, the front and rear ends of window strip 24 are in the form of outwardly stepped flanges 34 cooperating and dovetailing with complementary steps 32 in ends 18 to permit the inner surface of window 24 to lie flush with inner surface 16 of the temple bar 12.

Figure 4:
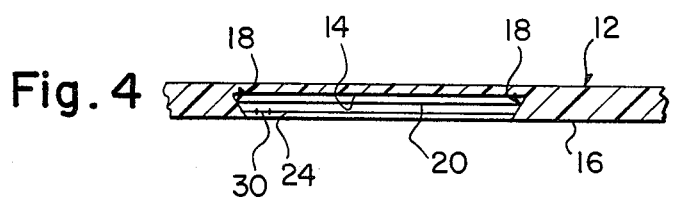
FIG. 4 is a cross-sectional view similar to FIG. 2 of another embodiment of a feature of this invention.

In the embodiment shown in FIG. 4, recess ends 18, instead of being stepped as at 32 in FIGS. 1, 2 and 3 are simply outwardly sloped to make the bottom of recess 14 longer than its opening. In this embodiment, window strip 24 is shown without flanges, being retained in the recess 14 like identification strip 20, by the slant of ends 18. The surface of window strip 24 is thereby just slighly below the level of inner surface 16 of the temple bar 12, but may if desired be also provided with outwardly stepped flanges, or its ends simply bent outward to conform with the slant of ends 18, to permit its inner surface to lie flush with the inner surface 16 of the temple bar 12.

This invention has been disclosed with respect to certain preferred embodiments, and it will be understood that modifications and variations thereof obvious to those skilled in the art are to be included within the spirit and purview of this application and the scope of the appended claims.

What is claimed is:

1. An eyeglass temple bar comprising means at the front end for attachment to the lens support member of an eyeglass frame and an ear supported portion at the back end, an oblong-shaped recess in the inner side of the portion between said ends, and retained within said recess a removable identification strip of flexible sheet material carrying identifying indicia on its inwardly facing surface, the opposite horizontal or vertical sides of said recess being undercut so that the bottom of the recess is wider or longer than the recess opening and said identification strip corresponding roughly in dimensions to said bottom.

2. A temple bar according to claim 1 wherein the opposite vertical sides of said recess are undercut.

3. A temple bar according to claim 2 further containing a removable window strip of transparent flexible sheet material corresponding roughly in dimensions to, and covering, said identification strip, said undercut thereby enabling retention of both said strips in said recess.

4. A temple bar according to claim 3 wherein each vertical end of said window strip is provided with an outwardly stepped flange to enable the surface of the window strip to be approximately flush with the inner surface of the temple bar.

5. A temple bar according to claim 4 wherein a vertical end of said window strip is provided with removal means enabling flexing said strip to facilitate its removal from said recess.

6. A temple bar according to claim 5 wherein said removal means comprises a hole, groove, dimple or protruberance.

7. A temple bar according to claim 1 wherein the opposite vertical sides of said recess are undercut so that the bottom of the recess is longer than the recess opening, said identification strip and a covering removable window strip of transparent flexible sheet material corresponding roughly in dimensions to said bottom, each vertical end of said window strip being provided with an outwardly stepped flange to enable the surface of said window strip to be approximately flush with the inner surface of the temple bar, a vertical end of said window strip being provided with removal means comprising a hole, groove, dimple or protruberance to enable flexing said window strip to facilitate its removal from said recess.

8. Eyeglasses comprising one or two temple bars as defined in claim 4.

9. Eyeglasses comprising one or two temple bars as defined in claim 2.

10. Eyeglasses comprising one or two temple bars as defined in claim 3.

11. Eyeglasses comprising one or two temple bars as defined in claim 4.

12. Eyeglasses comprising one or two temple bars as defined in claim 5.

13. Eyeglasses comprising one or two temple bars as defined in claim 6.

14. Eyeglasses comprising one or two temple bars as defined in claim 7.

* * * * *